(12) United States Patent
Lee (10) Patent No.: US 12,085,680 B2
(45) Date of Patent: Sep. 10, 2024

(54) SYSTEM AND METHOD FOR DRIVE CONTROL OF FRONT ULTRA-SONIC SENSORS

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,394

(22) Filed: Dec. 26, 2022

(65) Prior Publication Data
US 2023/0393252 A1  Dec. 7, 2023

(30) Foreign Application Priority Data
Jun. 7, 2022 (KR) .................. 10-2022-0068874

(51) Int. Cl.
| | |
|---|---|
| G01S 7/539 | (2006.01) |
| G01S 15/08 | (2006.01) |
| G01S 15/89 | (2006.01) |
| G01S 15/931 | (2020.01) |
| G06T 7/136 | (2017.01) |
| G06T 7/73 | (2017.01) |

(52) U.S. Cl.
CPC .............. *G01S 7/539* (2013.01); *G01S 15/08* (2013.01); *G01S 15/89* (2013.01); *G01S 15/931* (2013.01); *G06T 7/136* (2017.01); *G06T 7/73* (2017.01); *G01S 2015/932* (2013.01); *G01S 2015/937* (2013.01); *G06T 2207/30261* (2013.01)

(58) Field of Classification Search
CPC .......... G01S 7/539; G01S 15/08; G01S 15/89; G01S 15/931; G01S 2015/932; G01S 2015/937; G06T 7/136; G06T 7/73; G06T 2207/30261
See application file for complete search history.

(56) References Cited

U.S. PATENT DOCUMENTS

| | | | |
|---|---|---|---|
| 2020/0258327 A1* | 8/2020 | Bae ................. | G01S 13/931 |
| 2021/0232842 A1* | 7/2021 | Yamamoto ........ | G08G 1/166 |

FOREIGN PATENT DOCUMENTS

KR     20210143371 A     11/2021

\* cited by examiner

*Primary Examiner* — Hovhannes Baghdasaryan
*Assistant Examiner* — Abdallah Abulaban
(74) *Attorney, Agent, or Firm* — NovoTechIP International PLLC

(57) ABSTRACT

Provided are a system and a method for drive control of front ultrasonic sensors, which may automatically control a waveform output from the front ultrasonic sensor detecting the presence or absence of an obstacle in front of a vehicle to prevent the sensor from acting as an interference source for another vehicle even when the sensor is constantly driven.

14 Claims, 6 Drawing Sheets

SYSTEM AND METHOD FOR DRIVE CONTROL OF FRONT ULTRA-SONIC SENSORS

CROSS-REFERENCE TO RELATED APPLICATIONS

This application claims priority under 35 U.S.C. § 119 to Korean Patent Application No. 10-2022-0068874, filed on Jun. 7, 2022, in the Korean Intellectual Property Office, the disclosure of which is incorporated herein by reference in its entirety.

TECHNICAL FIELD

The following disclosure relates to a system and a method for drive control of front ultrasonic sensors, and more particularly, to a system and a method for drive control of front ultrasonic sensors, which may constantly drive the front ultrasonic sensor mounted on the front of a vehicle and detect the presence or absence of an obstacle in front by automatically controlling a drive state of the front ultrasonic sensor to prevent the sensor from being an interference source to another vehicle through image analysis of the front of the vehicle.

In particular, the following disclosure relates to a system and a method for drive control of front ultrasonic sensors, which may provide improved driving convenience by changing a threshold value of a confidence level of the image analysis, thereby minimizing misrecognition and non-recognition of an object (e.g., obstacle) in consideration of an external weather environment condition which may lower reliability of a result of the image analysis.

BACKGROUND

In recent years, various sensors (e.g., camera sensor and radar sensor) have been mounted inside/outside a vehicle to provide various advanced functions to assist a driver's safe and comfortable driving.

For example, the vehicle may be mounted with a 'front camera sensor' and a 'front radar sensor'. The front camera sensor may be usually installed on the top of a windshield of the vehicle to identify nearby objects and lanes in its driving direction, and the front radar sensor may be positioned on the radiator grill or the lower bumper to detect an object in front of the vehicle. The sensors may use these functions to provide a lane keeping assist (LKA) function, a lane following assist (LFA) function, a forward collision-avoidance assist (FCA) function, a smart cruise control (SCC), a highway driving assist (HAD) function, or the like.

The vehicle may also be mounted with a 'front ultrasonic sensor', and the front ultrasonic sensor may be mounted on the front bumper of the vehicle and detect a distance from an object within a predetermined distance (or a range that the ultrasonic sensor is able to detect) when the vehicle is moved forward. The sensor may use this function to provide a front parking distance warning (PDW) function. The PDW function is a function to notify the driver that there is an obstacle through a route notification in a case that the object is detected within the predetermined distance when the vehicle is moved forward, which is added to assist the vehicle to be safely moved when parked in or exiting from a narrow space such as an alley.

In addition, the vehicle may be mounted with a 'rear camera sensor' and a 'rear ultrasonic sensor'. The rear camera sensor may be mounted on the rear of the vehicle and transmit a rear situation to the driver through a navigation screen when the vehicle is moved backwards, and the rear ultrasonic sensor may be mounted on a rear bumper of the vehicle and detect a distance to an object within a predetermined distance (or a range that the ultrasonic sensor is able to detect) when the vehicle is moved backwards. The sensor may use this function to provide a reverse parking collision-avoidance assist (RCA) function, a parking distance warning (PDW) function and a remote smart parking assist (RSPA) function, and use the above function of the front camera sensor together to provide a surround view monitor (SVM) function.

The vehicle may also be mounted with a 'rear-lateral radar sensor'. Unlike the rear ultrasonic sensor, the rear-lateral radar sensor may be mounted in the rear bumper and detect an object in the rear-lateral side of the vehicle. The sensor may use this function to provide a blind-spot collision-avoidance assist (BCA) function and a safe exit assist (SEA) function.

The driver may enjoy various advanced functions of the vehicle when the various sensors mounted on the vehicle are constantly driven without the driver's additional operation (or lower driving concentration).

However, in general, the vehicle is designed in such a manner that the front ultrasonic sensor and the rear ultrasonic sensor use ultrasonic sensors of the same specification that are different from each other only in their mounting positions.

Therefore, when these ultrasonic sensors are constantly driven, ultrasonic sensors installed and operated on different vehicles may act as mutual noise sources/interference sources, thereby lowering an overall performance of a parking assistance system. That is, a signal of the ultrasonic sensor installed on the driver's vehicle may interfere with a signal of the ultrasonic sensor of another vehicle, which may cause errors in the advanced functions of both the vehicles.

Figure 1:
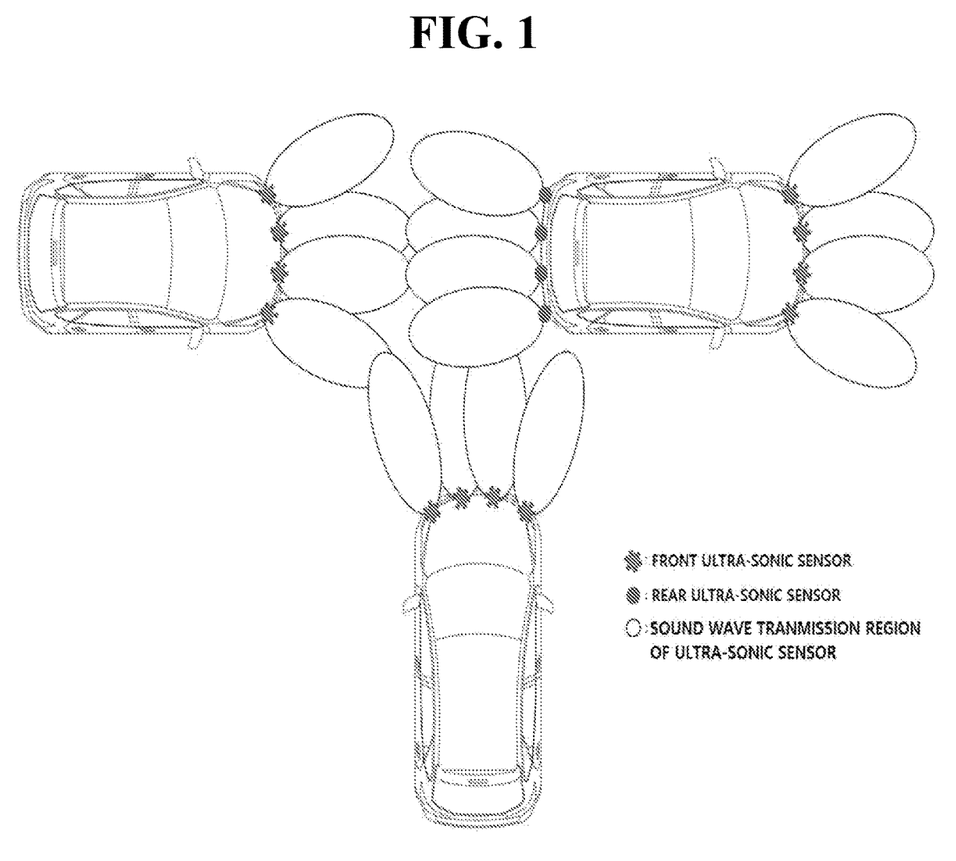
FIGS. 1 and 2 are exemplary views each showing interference with other vehicles occurring by driving of a conventional front ultrasonic sensor.

As an example of a situation where the interference occurs, as shown in FIG. 1, four front ultrasonic sensors may be generally mounted on the front bumper of a vehicle. Here, a front-center ultrasonic sensor may transmit a front ultrasonic wave, and a front-lateral ultrasonic sensor may transmit a front-lateral ultrasonic wave. When the front ultrasonic sensor is constantly driven, the front ultrasonic wave may be blocked from transmitting its energy by reflection of a vehicle in a case that there is the vehicle in front (i.e., unless the vehicle in front is moved backward and activates its rear ultrasonic sensor). However, the front ultrasonic sensor of a vehicle entering from another direction may interfere with the front-lateral ultrasonic wave.

Figure 2:
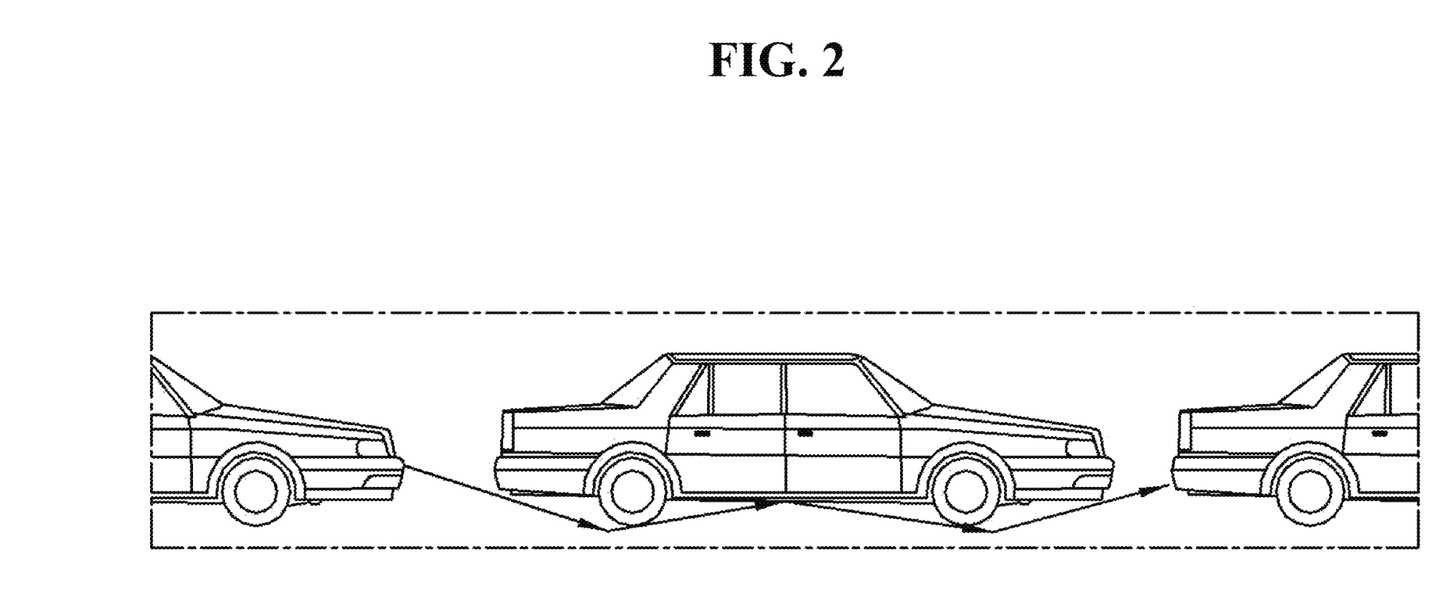

In addition, as shown in FIG. 2, even when there is a vehicle only in front, the front ultrasonic wave may not be blocked from transferring its energy by reflection of a vehicle in front, and transmitted to another vehicle to cause the interference due to diffused reflection between the ground and the underside of the vehicle.

As described above, the ultrasonic sensor of a nearby vehicle may have an increased probability of performing misdetection when there is the nearby vehicle of which the ultrasonic sensor is constantly driven. In order to solve this problem, proposed is a method of activating the ultrasonic sensor only when necessary by fundamentally classifying its operation condition.

The rear ultrasonic sensor may be set to be activated only when a vehicle gear is in an 'R' stage which is an explicit reverse situation, thereby lowering the probability of misdetection/false alarm.

However, in a case of the front ultrasonic sensor, both a parking situation where the front parking distance warning (PDW) function needs to be provided and a general driving situation are in the same condition in which the gear is in a 'D' stage. It is thus impossible to set the front ultrasonic sensor to be activated only in the parking situation by classifying (or determining) the situation. That is, it is almost impossible to activate the front ultrasonic sensor by determining this situation as the parking situation even when the vehicle enters a parking lot and approaches an obstacle in front.

Accordingly, until now, the front ultrasonic sensor is set to be activated only by the driver's operation (of a PDW switch) as a drive condition of the sensor.

When the vehicle enters a parking lot or narrow alley having a narrow passage, it may not only be inconvenient for the driver to operate the PDW switch while being careful about scratching the vehicle, but also cause another problem in that a risk of an accident is increased as the driver neglects to watch the front while operating the PDW switch because the PDW switch is usually positioned near a gear knob. For this reason, it is inevitably difficult for the driver to properly utilize the advanced function of the front parking distance warning (PDW) function.

In this regard, Korean Patent Laid-Open Publication No. 10-2021-0143371 (entitled, "VEHICLE FRONT OBJECT DETECTION SYSTEM AND METHOD"), discloses technology for further improving safety of a vehicle by analyzing information on a front object detected by an ultrasonic sensor when a driving condition of the vehicle satisfies a predetermined standard condition, and controlling the vehicle by using the analyzed information.

SUMMARY

Embodiments of the present disclosure are directed to providing a system and a method for drive control of front ultrasonic sensors, which may automatically control a transmission waveform output from the front ultrasonic sensor through image analysis of the front of a vehicle to minimize the output waveform transmitted to another vehicle while constantly driving the front ultrasonic sensor, thereby minimizing interference with another vehicle due to the transmitted waveform.

In particular, embodiments of the present disclosure are directed to providing a system and a method for constant-drive control of front ultrasonic sensors, which may improve reliability of automatic control for the constant-drive of the front ultrasonic sensor by changing a threshold value of a confidence level of an image analysis, thereby minimizing misrecognition and non-recognition of an object in consideration of an external weather environment condition which may lower reliability of a result of the image analysis.

In one general aspect, a system for drive control of front ultrasonic sensors mounted on the front of a vehicle and detecting an obstacle positioned in front of the vehicle includes: an image reception unit receiving vehicle front image data; a feature extraction unit extracting a feature map for each pixel by inputting the vehicle front image data to a pre-stored network; a distance analysis unit analyzing distance information between an obstacle in an object region and the vehicle by using the extracted feature map; and a drive control unit automatically controlling a drive state of the front ultrasonic sensor by using the distance information.

The feature extraction unit using a semantic segmentation network may include: a weather classification unit classifying a predetermined weather class for each pixel; a region classification unit classifying a predetermined region class for each pixel; an entropy calculation unit extracting a pixel classified into the object region by the region classification unit and calculating entropy of the extracted pixel; a comparison processing unit comparing a threshold entropy corresponding to a classified weather class of the corresponding pixel and a calculated entropy of the corresponding pixel, based on the predetermined threshold entropy for each weather class; and a final segmentation unit finally segmenting the corresponding pixel into the object region when the calculated entropy is less than the threshold entropy, based on a result of the comparison processing unit.

The final segmentation unit may finally segment the corresponding pixel into a free space region when the calculated entropy is greater than or equal to the threshold entropy, based on the result of the comparison of the comparison processing unit.

The distance analysis unit may analyze the distance information by using a result of the segmentation of the object region by the final segmentation unit.

The drive control unit may include: a first determination unit determining whether the distance information is within a first predetermined distance; and a first control unit controlling a waveform output from the front ultrasonic sensor to have a predetermined value when the distance information does not fall within the first predetermined distance, based on a result of the determination of the first determination unit.

The drive control unit may further include: a second determination unit determining whether the distance information falls within a range of a second predetermined distance when the distance information falls within the first predetermined distance, based on the result of the determination of the first determination unit; and a second control unit controlling the waveform output from the front ultrasonic sensor to correspond to the distance information when the distance information falls within the range of the second predetermined distance, based on a result of the determination of the second determination unit.

The drive control unit may further include a reception control unit controlling a reception amplification factor in response to the control of the waveform output from the front ultrasonic sensor by using pre-stored reception amplification factor information.

The drive control unit may further include a noise determination unit collecting a signal received without the transmission waveform before the controlled waveform output from the front ultrasonic sensor is transmitted, and comparing the collected received signal with a predetermined threshold signal to noise ratio (SNR), and the drive control unit deactivates the automatic control of the front ultrasonic sensor, and provides a vehicle occupant with an associated alarm signal, when the collected received signal is higher than the predetermined threshold SNR, based on a result of the determination of the noise determination unit.

In another general aspect, a method for drive control of front ultrasonic sensors, in which the method uses a system for drive control of front ultrasonic sensors, each operation of the system being performed by a calculation processing means, includes: an image input operation (S100) of receiving vehicle front image data; a feature extraction operation (S200) of extracting a feature map for each pixel by inputting the vehicle front image data received in the image input operation (S100) to a pre-stored network; a distance analysis operation (S300) of analyzing distance information between an obstacle in an object region and a vehicle by using the feature map extracted in the feature extraction operation (S200); and a drive control operation (S400) of automatically controlling a drive state of the front ultrasonic sensor mounted on the front of the vehicle and detecting the obstacle in front of the vehicle by using the distance information analyzed in the distance analysis operation (S300).

The feature extraction operation (S200) may include: a weather classification operation (S210) of classifying a predetermined weather class for each pixel; a region classification operation (S220) of classifying a predetermined region class for each pixel; a pixel extraction operation (S230) of extracting a pixel classified into an object region in the region classification operation (S220); an entropy calculation operation (S240) of calculating entropy of the pixel extracted in the pixel extraction operation (S230); an entropy comparison operation (S250) of comparing a threshold entropy corresponding to a weather class of the pixel extracted in the pixel extraction operation (S230), classified in the weather classification operation (S210), and a calculated entropy of the corresponding pixel, obtained in the entropy calculation operation (S240), based on the predetermined threshold entropy for each weather class; and a final segmentation operation (S260) of finally segmenting the corresponding pixel into the object region when the calculated entropy obtained in the entropy calculation operation (S240) is less than the threshold entropy, based on a result of the comparison in the entropy comparison operation (S250).

In the final segmentation operation (S260), the corresponding pixel may be finally segmented into a free space region when the calculated entropy obtained in the entropy calculation operation (S240) is greater than or equal to the threshold entropy, based on the result of the comparison in the entropy comparison operation (S250).

In the distance analysis operation (S300), the obstacle may be extracted using a result of the final segmentation of the object region in the final segmentation operation (S260), and the distance information between the obstacle and the vehicle may be analyzed.

The drive control operation (S400) may include: a first determination operation (S410) of determining whether the distance information analyzed in the distance analysis operation (S300) falls within a first predetermined distance; and a first control operation (S420) of controlling a waveform output from the front ultrasonic sensor to have a predetermined value when the distance information does not fall within the first predetermined distance, based on a result of the determination in the first determination operation (S410).

The drive control operation (S400) may further include: a second determination operation (S430) of determining whether the distance information analyzed in the distance analysis operation (S300) falls within a range of a second predetermined distance when the distance information falls within the first predetermined distance, based on the result of the determination in the first determination operation (S410); and a second control operation (S440) of controlling the waveform output from the front ultrasonic sensor to correspond to the distance information when the distance information falls within the range of the second predetermined distance, based on a result of the determination in the second determination operation (S430).

The drive control operation (S400) may further include a third control operation (S450) of controlling a reception amplification factor of the front ultrasonic sensor in response to the control of the waveform output from the front ultrasonic sensor by using pre-stored reception amplification factor information.

The drive control operation (S400) may further include: a noise collection operation (S460) of collecting a signal received without the transmission waveform before the controlled waveform output from the front ultrasonic sensor is transmitted; a noise comparison operation (S470) of comparing the received signal collected in the noise collection operation (S460) with a predetermined threshold signal to noise ratio (SNR); and an alarm provision operation (S480) of deactivating the automatic control of the front ultrasonic sensor, and providing a vehicle occupant with an associated alarm signal, when the collected received signal is higher than the predetermined threshold SNR, based on a result of the determination in the noise comparison operation (S470).

DETAILED DESCRIPTION

Hereinafter, a system and a method for drive control of front ultrasonic sensors according to embodiments of the present disclosure are described in detail with reference to the accompanying drawings.

A system may refer to a set of components including devices, mechanisms, means, and the like that are systematized and regularly interact with each other to perform required functions.

A front ultrasonic sensor for a vehicle, mounted on the front of a vehicle, may detect the presence or absence of an obstacle in front of the vehicle, and assist a driver's safe and comfortable driving in a complex driving environment, such as entering or exiting a parking lot or narrow alleyway having a narrow passage which requires a front parking distance warning (PDW) function.

When the front ultrasonic sensor is constantly driven, as described above, a signal of the ultrasonic sensor of vehicle A may act as a noise source/interference source for an ultrasonic sensor of vehicle B to lower a parking assist performance such as causing a false warning or the like. In order to solve this problem, in general, the front ultrasonic sensor may be set to be activated only when the driver operates a PWD switch.

However, this configuration may lead to a more significant problem in that a risk of an accident is increased as the driver's concentration on the driving is reduced due to the operation of the PWD switch itself in the complex driving environment.

Accordingly, the system and method for drive control of front ultrasonic sensors according to embodiments of the present disclosure may relate to technology for automatically controlling a transmission waveform output from the sensor in consideration of a distance between an object (e.g., obstacle) and the vehicle through image analysis of the front of the vehicle to provide the safe and comfortable driving function using the front parking distance warning (PDW) function by constantly driving the front ultrasonic sensor mounted on the front of a vehicle while solving the problem (i.e., the sensor acting as the interference source for another vehicle) occurring due to its constant drive as described above.

In particular, the system and method for drive control of front ultrasonic sensors according to embodiments of the present disclosure may relate to technology for minimizing misrecognition of the object by performing the image analysis more conservatively through a change in a threshold value of a confidence level in the image analysis in consideration of an external weather environment condition (e.g., cloudy, rainy, or snowy weather condition) which may lower reliability of a result of the image analysis, and for simultaneously controlling a reception amplification factor to solve non-recognition of the object which may still occur.

Figure 3:
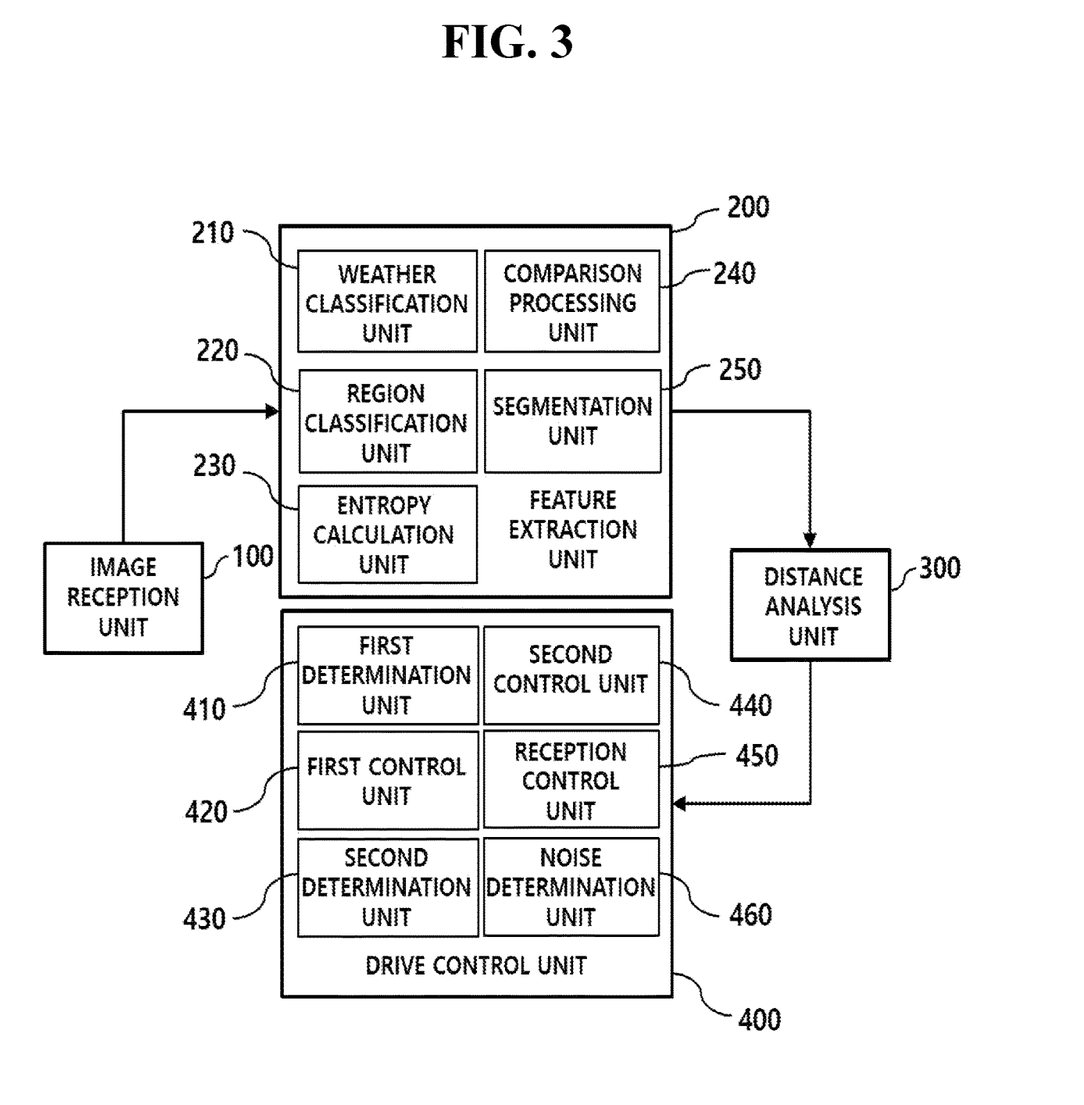
FIG. 3 is a configuration diagram of a system for drive control of front ultrasonic sensors according to an embodiment of the present disclosure.

FIG. 3 is a configuration diagram of a system for drive control of front ultrasonic sensors according to an embodiment of the present disclosure.

As shown in FIG. 3, the system for drive control of front ultrasonic sensors according to an embodiment of the present disclosure may include an image reception unit 100, a feature extraction unit 200, a distance analysis unit 300 and a drive control unit 400. Each component may be operated through a calculation processing means such as an electronic control unit (ECU) including a computer that performs transmission and reception through an in-vehicle communication channel.

In addition, in the system for drive control of front ultrasonic sensors according to an embodiment of the present disclosure, at least four front ultrasonic sensors (i.e., front left sensor, front center left sensor, front center right sensor, and front right center) produced on the same production line as the same productions may be mounted on the front of the vehicle, and perform their operations in a state where the sensors are constantly driven to detect obstacles positioned in front of the vehicle.

For reference, at least four rear ultrasonic sensors (i.e., rear left sensor, rear center left sensor, rear center right sensor, rear right sensor) produced on the same production line as the front ultrasonic sensor may also be mounted on the rear of the vehicle, and perform their operations to detect obstacles positioned at the rear of the vehicle. The rear ultrasonic sensor may be driven to be activated only when a vehicle gear is in the 'R' stage which is an explicit reverse situation.

First, the system for drive control of front ultrasonic sensors according to an embodiment of the present disclosure may analyze a mounting position of each of the plurality of front ultrasonic sensors mounted on the vehicle, as a basic condition to be performed in advance, to classify an ultrasonic sensor mounted on the side (i.e., front left sensor or front right sensor) and a front ultrasonic sensor mounted on the center (i.e., front center left sensor or front center right sensor), thereby automatically controlling a drive state of the front ultrasonic sensor mounted on the center.

Here, the mounting position of the sensor may be classified by using identification (ID) information assigned in advance for each front ultrasonic sensor or ID information assigned in advance to a connection cable of each front ultrasonic sensor.

In detail, the mounting position may be classified based on a connection cable type of the plurality of rear ultrasonic sensors. When one controller is connected to the same line (or uses a bus-type connection), the mounting position may be classified through personal identification number (PIN) ID additionally assigned to each rear ultrasonic sensor. On the other hand, when one controller is connected to each line (or uses a star-type connection), the ID may be assigned in advance to which position the sensor is mounted for each line, and the mounting position may be classified by using this assignment.

In this way, the waveform output from the corresponding front ultrasonic sensor may be forcibly controlled to a predetermined value set in advance when the sensor is classified as the front ultrasonic mounted on the side.

When reviewing specific requirements of the front ultrasonic sensor, all the sensors may have the same specifications. However, the front center ultrasonic sensor may have 120 cm as the minimum detection distance condition when mounted on the center, and may have 60 cm, which is less than 120 cm, as the minimum detection distance condition when mounted on the side. The output of the transmission waveform may be forcibly controlled to the minimum value set enough to satisfy the minimum detection distance condition in consideration of this point when the sensor is classified as the front ultrasonic sensor mounted on the side.

The system for drive control of front ultrasonic sensors according to an embodiment of the present disclosure may automatically control the drive state of the front ultrasonic sensor mounted on the center based on these basic conditions, and the front ultrasonic sensor described below may indicate the front ultrasonic sensor mounted on the center.

The respective components will be described below in detail.

Figure 4:
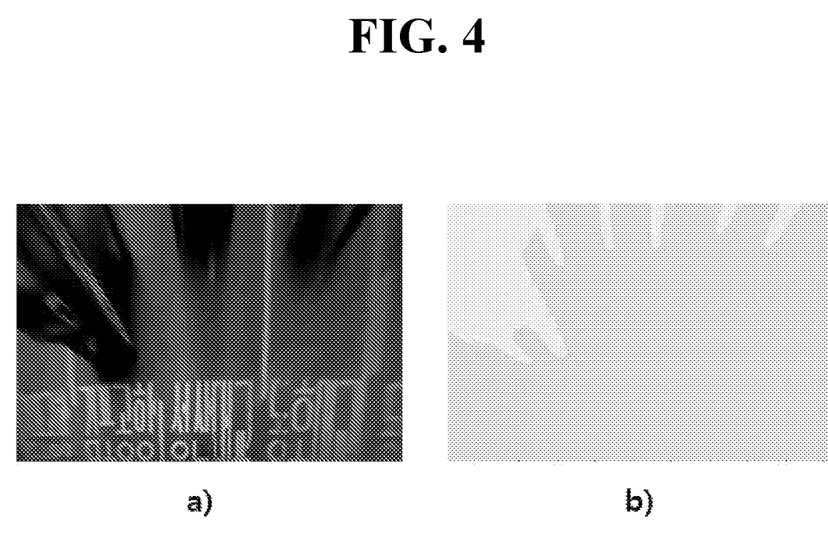
FIG. 4 is a view showing a result of region segmentation of the system and method for drive control of front ultrasonic sensors according to embodiments of the present disclosure.

The image reception unit 100 may receive, from a linked unit (e.g., surround view monitoring (SVM) system), vehicle front image data generated by matching images input from a plurality of camera sensors mounted on the vehicle into one view. That is, the image reception unit 100 may receive the vehicle front image data converted into an air view by the SVM system (see FIG. 4A).

The feature extraction unit 200 may extract a feature map for each pixel included in the vehicle front image data by inputting the vehicle front image data received from the image reception unit 100 to a pre-stored network.

In detail, the feature extraction unit 200 may apply the pre-stored semantic segmentation network to extract the feature map for each pixel, and segment the pixels into a free space region and an object region (e.g., obstacle, vehicle, or person) as shown in FIG. 4B.

The pre-stored semantic segmentation network may use a semantic image segmentation algorithm of a fully convolutional network. However, this network is only an example of the present disclosure, the present disclosure is not limited thereto, and may use any network that may distinguish and classify desired regions through the image analysis/processing.

Simply and most ideally, the feature extraction unit 200 may accurately segment the free space region and the object region by using the stored semantic segmentation network, and thus analyze the distance (or distance information) between the obstacle in the object region and the vehicle, thereby automatically controlling the drive state of the front ultrasonic sensor based on the analyzed distance information.

However, the vehicle front image data may have lower clarity, illuminance, or the like, or a noise region caused by snow or rain, based on the external environment condition, such as cloudy, snowy, or rainy weather. In this case, the result of the image analysis of the semantic segmentation network may have lower accuracy/reliability.

Another additional problem may occur due to misrecognition of the obstacle (or recognition of the free space region as the object region) or non-recognition of the obstacle (or recognition of the object region as the free space region) which may occur if the feature extraction unit 200 automatically controls the drive state of the front ultrasonic sensor by performing the image analysis only based on a result of the region segmentation without considering the external environment condition.

Accordingly, the feature extraction unit 200 of the system for drive control of front ultrasonic sensors according to an embodiment of the present disclosure may analyze the vehicle front image data more conservatively to reduce the misrecognition of the obstacle.

For example, no object exists within 2 m in front on a rainy day. Here, the drive control unit 400 described below may perform a normal control operation of reducing and controlling the waveform output from the front ultrasonic sensor to the minimum value. The waveform output from the front ultrasonic sensor may not be controlled when a raindrop is recognized as an object, thus including a possibility that an unreduced transmission signal spreads to a wide space and causes the interference to another vehicle. However, as described above, the feature extraction unit 200 does not recognize a raindrop on a rainy day as the object by performing the image analysis in consideration of the external environment condition, and may thus perform its operation for the sensor to be in the normal control.

To this end, the feature extraction unit 200 may include a weather classification unit 210, a region classification unit 220, an entropy calculation unit 230, a comparison processing unit 240, and a final segmentation unit 250, as shown in FIG. 3.

The weather classification unit 210 may classify a predetermined weather class for each pixel of the input vehicle front image data.

The region classification unit 220 may classify a predetermined region class for each pixel of the input vehicle front image data.

A general semantic segmentation network may classify each pixel by using a predetermined region class (e.g., object region or free space region), and a result of the classification may be output in the form of a probabilistic map by a softmax function applied as the final activation function when the network performs learning. However, the feature extraction unit 200 using the semantic segmentation network of the present disclosure may further include the weather classification unit 210 to classify a weather condition of the image to determine whether the image has an environment of a lower analysis performance (or recognition performance).

To this end, the semantic segmentation network may minimize an increase in its calculation amount by categorizing the weather by additionally connecting two fully connected layers thereto without including a separate base network because an encoder output of the network is an abstract feature. A result of the weather classification may also be output in the form of a probability map by the softmax function applied as the final activation function when the network performs the learning. In addition, the network may perform the learning by using the predetermined weather class (e.g., sunny, cloudy, rainy, or snowy day). That is, the semantic segmentation network applied to the feature extraction unit 200 may be a semantic segmentation network using a weather classification head, using cross entropy loss as a loss function, and using stochastic gradient descent to perform the learning while updating a weight during its supervised learning.

The entropy calculation unit 230 may extract a pixel having the largest probability value of the object region (or a pixel classified into the object region) by the region classification unit 220, and calculate entropy of the extracted pixel by using Equation 1 below:

$$\text{entropy} = -\sum_{h=0}^{H-1}\sum_{h=0}^{W-1} s_{h,w} \log s_{h,w} \quad \text{[Equation 1]}$$

(Here, s is the network output, and H and W are the height and width of the network output).

The entropy refers to a degree of uncertainty/confidence level of the output, and low entropy indicates low uncertainty.

The general semantic segmentation network may extract the obstacle by using the pixel having the largest probability value of the object region without considering the entropy itself.

However, the feature extraction unit 200 may classify the object region and the free space region in units of weather and pixels by using the semantic segmentation network which uses the weather classification head. That is, the feature extraction unit 200 may only classify a pixel having low entropy as a final object region to reduce a probability that the free space region is misrecognized as the object region based on the external weather condition.

The comparison processing unit 240 may compare a threshold entropy corresponding to a weather class of the corresponding pixel, classified by the weather classification unit 210, and a calculated entropy of the corresponding pixel, obtained by the entropy calculation unit (230), based on the predetermined threshold entropy for each weather class.

The predetermined threshold entropies may be set to the following values: 1 as a threshold entropy of a sunny day having the lowest probability of an error occurring in analyzing the vehicle front image data, the smallest value (e.g., 0.3) as a threshold entropy of a rainy/snowy day having the highest probability of analysis error, and a medium value (e.g., 0.5) as a threshold entropy of a cloudy day having a medium probability of analysis error. Threshold entropy setting may be controlled based on detection sensitivity setting of the object region by the feature extraction unit 200.

In this way, the comparison processing unit 240 may set the threshold entropy based on the classified weather of the corresponding pixel, thus setting a lower threshold entropy for the weather condition having a higher probability of analysis error, and then perform the comparison between the set threshold entropy and the calculated entropy.

The final segmentation unit 250 may finally segment the corresponding pixel into the object region when the calculated entropy is less than the threshold entropy, based on a result of the comparison processing unit 240.

That is, the final segmentation unit 250 may perform the final segmentation processing by using a pixel primarily classified into the object region by the entropy calculation unit 230 to set the threshold entropy based on a weather of the corresponding pixel, and then determine that a result of the primary classification has very high accuracy when the calculated entropy is lower than the set threshold entropy.

In other words, the final segmentation unit 250 may classify, as a final result value, a result value of a pixel (i.e., pixel having very low uncertainty) having a lower entropy than the threshold entropy (or a criterion that separates uncertainty/certainty) that is lower as the weather condition has the higher probability of analysis error.

The final segmentation unit 250 may finally segment the corresponding pixel into the free space region by determining that even the pixel primarily classified into the object region has high uncertainty when the calculated entropy is greater than or equal to the threshold entropy, based on the result of the comparison processing unit 240.

The distance analysis unit 300 may analyze the distance information between the obstacle in the object region and the vehicle by using a result of the segmentation of the object region by the final segmentation unit 250.

In detail, the distance analysis unit 300 may analyze a pixel position corresponding to the object region segmented by the final segmentation unit 250 to analyze the distance information between the vehicle and the obstacle (or a group region including the object region). That is, each pixel position may represent physical coordinates of each pixel in the vehicle front image data converted to the air view, and the distance analysis unit 300 may thus calculate the distance information by analyzing the pixel position corresponding to the obstacle region.

The drive control unit 400 may automatically control the drive state of the front ultrasonic sensor by using the distance information provided by the distance analysis unit 300.

To this end, the drive control unit 400 may include a first determination unit 410, a first control unit 420, a second determination unit 430, and a second control unit 440, as shown in FIG. 3.

The ultrasonic wave transmitted from the ultrasonic sensor is more likely to interfere with another vehicle as a free space in front is increased. The drive control unit 400 may minimize the unnecessary interference by reducing the transmission waveform output from the front ultrasonic sensor in consideration of this condition when there is no obstacle within the predetermined distance.

The first determination unit 410 may determine whether the distance information (or the distance information between the vehicle and the detected obstacle) falls within a range of a first predetermined distance set in advance.

The first control unit 420 may control the waveform output from the front ultrasonic sensor to have the predetermined value when the distance information does not fall within the range of the first predetermined distance (or is more than the first predetermined distance), based on a result of the determination of the first determination unit 410. Here, the distance information does not fall within the range of the first predetermined distance when an obstacle exists beyond the range of the first predetermined distance or there is no obstacle.

The first control unit 420 may set the predetermined value as the minimum value in consideration of the minimum detection distance condition of the front ultrasonic sensor, and reduce the output transmission waveform to satisfy the minimum requirement, and the front ultrasonic sensor may thus determine only whether there is a nearby obstacle through the minimum output. In this way, the first control unit 420 may minimize the transmission waveform to act as the noise source for an ultrasonic sensor of another vehicle while satisfying the requirement of the front ultrasonic sensor.

In the control of reducing the transmission waveform output from the front ultrasonic sensor, the first control unit 420 may control the output waveform by changing a magnitude of a current source or a voltage source.

Here, there may occur the non-recognition of the obstacle (or recognition of the object region as the free space region) in the feature extraction unit 200 due to the weather condition having a high probability of analysis error of the vehicle front image data, and the first control unit 420 may still set the waveform output from the sensor to the minimum value, thus causing an accident such as collision with an obstacle that actually exists.

The drive control unit 400 may further include a reception control unit 450 as shown in FIG. 3 in order to solve this problem.

The reception control unit 450 may control the reception amplification factor in response to the control of the waveform output from the front ultrasonic sensor by using pre-stored reception amplification factor information.

That is, the reception control unit 450 may adjust the reception amplification factor in an end of line (EOL) in advance based on a situation where the transmission waveform output from the front ultrasonic sensor is gradually reduced to the minimum value, and store its result so that the transmission waveform output from the front ultrasonic sensor has the same sensitivity (or detection distance) even when controlled to be reduced.

In this way, the reception control unit 450 may change and set the reception amplification factor based on the controlled output waveform when the transmission waveform output from the front ultrasonic sensor is controlled, that is, controlled to be reduced to the minimum value by the first control unit 420. The transmission waveform may thus have the same sensitivity as before the reduction even when the transmission waveform is reduced.

In addition, it is enough for the sensor only to detect the nearby obstacle having a risk of collision within the first predetermined distance. However, the present disclosure sets 2 m as a reference distance for reducing the waveform output from the front ultrasonic sensor to prevent the ultrasonic wave signal from causing the interference rather than being blocked by the obstacle due to an excessively wide free space in front of the vehicle, which is only an example. The first predetermined distance may be a distance at which a driver watching the front may sufficiently prepare for the presence of the obstacle beyond the first predetermined distance without a separate collision detection assist function. The first predetermined distance may be further increased based on a feedback or the like of the actual vehicle driver when the first predetermined distance is insufficient for the driver to detect and prepare for the obstacle without the collision detection assist function.

The second determination unit 430 may determine once again whether the distance information falls within a range of a second predetermined distance when the distance information falls within the first predetermined distance (or the first predetermined distance or less), that is, when the distance information between the vehicle and the detected obstacle is within 2 m, based on the result of the determination of the first determination unit 410.

The second control unit 440 may control the waveform output from the second ultrasonic sensor to correspond to the distance information when the distance information falls within the range of the second predetermined distance, based on a result of the determination of the second determination unit 430.

In detail, the second determination unit 430 may set the range of the second predetermined distance range to 0.6 m to 1.2 m, which is a distance at which ground reflection may occur, which is also only an example. To explain using this configuration for a proper explanation, the waveform output from the second ultrasonic sensor may be controlled to remain in a default drive state when the distance information does not fall within the range of the second predetermined distance, based on the result of the determination of the second determination unit 430.

That is, the second control unit 440 may control the front ultrasonic sensor to have an output waveform corresponding to the distance information calculated by Equation 2 below when the distance information is 0.6 m or more and 1.2 m or less.

$$y=150/0.6(x-0.6)+10C \qquad \text{[Equation 2]}$$

(Here, y is a transmitted current, and x is the distance information).

In addition, the second control unit 440 may control the front ultrasonic sensor to produce a normal output in the default drive state, thereby performing remote detection when the distance information is more than 1.2 m and is 2 m or less, and may control the front ultrasonic sensor to output the normal output in the default drive state, thereby detecting an obstacle which may impact a vehicle bumper, such as a road bump, in a case that the vehicle out of a beam angle has the minimum ground clearance when the distance information is less than 0.6 m.

The reception control unit 450 may control the reception amplification factor in response to the control of the waveform output from the front ultrasonic sensor by using the reception amplification factor information pre-stored also by the operation of the second control unit 440.

Figure 5:
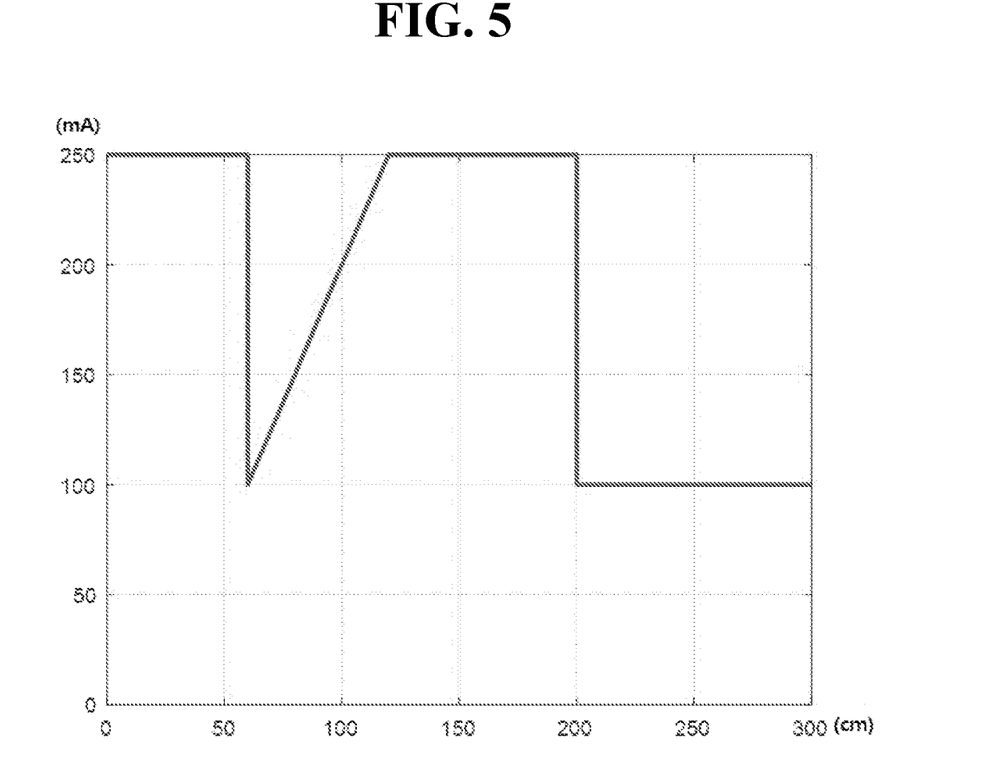
FIG. 5 is a view for explaining a control level of a drive state of the front ultrasonic sensor based on distance information by the system and method for drive control of the front ultrasonic sensors according to embodiments of the present disclosure.

In summary, the drive control unit 400 may automatically control the waveform output from the front ultrasonic sensor in response to the distance information provided by the distance analysis unit 300 as shown in FIG. 5.

In detail, the drive control unit 400 may control the waveform output from the front ultrasonic sensor to be reduced to the minimum possible value when there is no nearby obstacle within 2 m of the vehicle; may control the waveform output from the front ultrasonic sensor to perform the remote detection through the normal output in the default drive state when the nearby obstacle is detected (or when the obstacle is detected in the distance of more than 1.2 m and 2 m or less); may control the waveform output from the front ultrasonic sensor to be reduced in response to the distance information to minimize the interference with another vehicle, occurring due to a ground reflection wave when a more nearby obstacle is detected (or in the distance of 0.6 m or more to 1.2 m or less); and may control the waveform output from the front ultrasonic sensor to return to the default drive state to detect a road condition outside the beam angle when an ultra-nearby obstacle is detected (or in the distance of less than 0.6 m).

In this way, the drive control unit 400 may automatically control the waveform output from the front ultrasonic sensor variably based on the distance between the vehicle and the obstacle analyzed with high reliability, and may thus minimize the ultrasonic wave transmitted to another vehicle even when the front ultrasonic sensor is constantly driven, which may solve the problems described above.

However, a signal-to-noise ratio (SNR) may be lower when the reception amplification factor is increased by the operation of the reception control unit 450 as the output of the front ultrasonic sensor is reduced.

Accordingly, it may be checked whether a current drive control environment is a noisy environment and the constant drive of the front ultrasonic sensor may be forcibly turned off if there is a significant noise.

That is, the drive of the front ultrasonic sensor itself is an auxiliary function to improve driving convenience rather than an essential function required to drive the vehicle, and there is no problem in driving even when the sensor is forcibly turned off. However, it is required to notify this turn off to the driver to allow the driver who wants this function to manually control the sensor.

To this end, the drive control unit 400 may further include a noise determination unit 460 as shown in FIG. 3.

The noise determination unit 460 may collect a signal received without the transmission waveform through the reception amplification factor controlled based on the waveform of the sensor, that is, perform noise measurement before the controlled waveform output from the front ultrasonic sensor is transmitted, that is, before the output waveform controlled by the first control unit 420 or the second control unit 440 is transmitted.

The noise determination unit 460 may then compare the collected received signal with a predetermined threshold SNR. Here, the threshold SNR may be predetermined in response to the controlled reception amplification factor.

The drive control unit 400 may deactivate the automatic control of the front ultrasonic sensor, and provide a vehicle occupant with an associated alarm signal indicating that the automatic control of the front ultrasonic sensor is deactivated, when the collected received signal is higher than the predetermined threshold SNR, based on a result of the determination of the noise determination unit 460.

On the other hand, the drive control unit 400 may perform the automatic drive control of the front ultrasonic sensor described above when the collected received signal is lower than the predetermined threshold SNR, based on the result of the determination of the noise determination unit 460.

Figure 6:
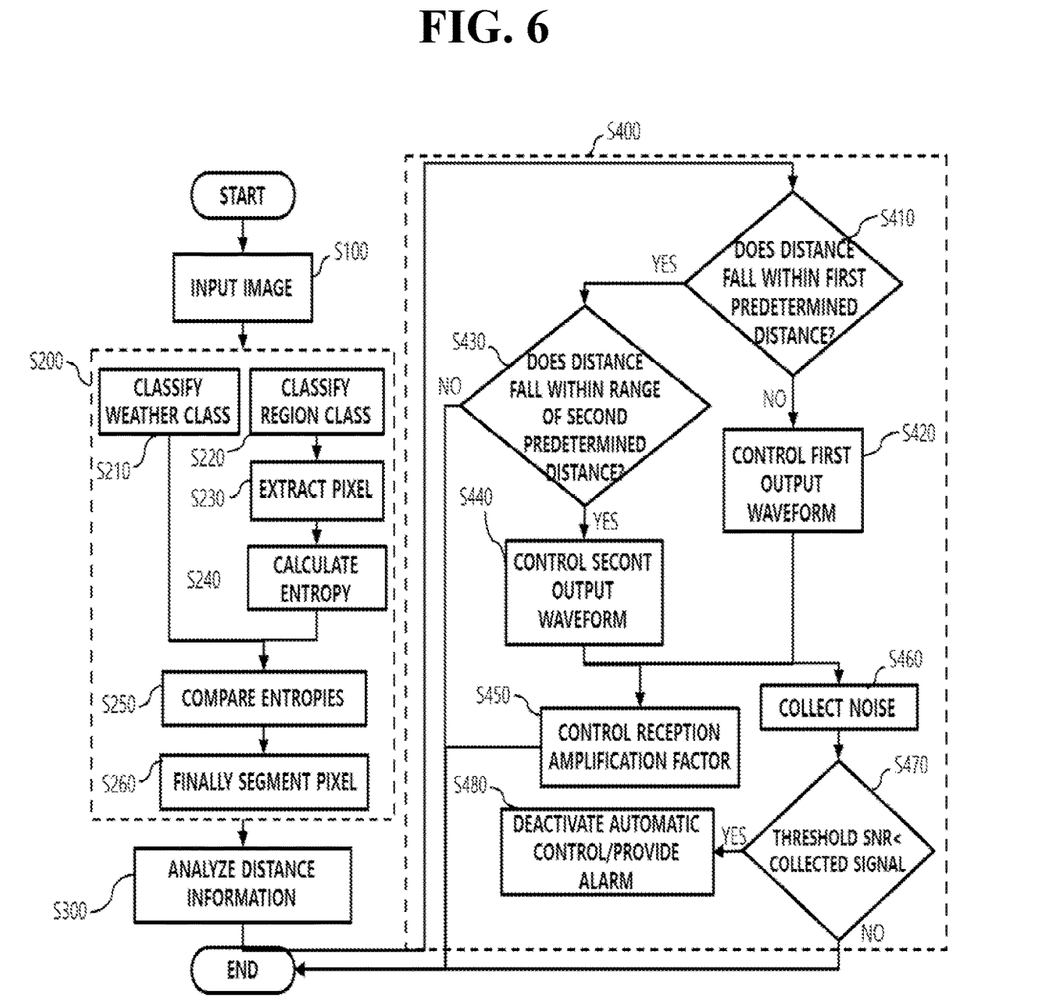
FIG. 6 is a flowchart of a method for drive control of front ultrasonic sensors according to another embodiment of the present disclosure.

FIG. 6 is a flowchart of a method for drive control of front ultrasonic sensors according to another embodiment of the present disclosure.

As shown in FIG. 6, the method for drive control of front ultrasonic sensors according to another embodiment of the present disclosure may include an image input operation (S100), a feature extraction operation (S200), a distance analysis operation (S300), and a drive control operation (S400).

Each operation may be performed using the system for drive control of front ultrasonic sensors that are operated by a calculation processing means.

The method for drive control of front ultrasonic sensors according to another embodiment of the present disclosure may be performed when satisfying its basic operation condition that at least four sensors, mounted on the front of a vehicle and detecting obstacles positioned in front of the vehicle, are constantly driven. A drive state of a front ultrasonic sensor mounted on the center among the four front ultrasonic sensors may here be automatically controlled by the method according to the present disclosure.

The image input operation (S100) may be an operation of receiving, by an image reception unit 100 as the calculation processing means, from a linked unit (e.g., surround view monitoring (SVM) system), vehicle front image data generated by matching images input from a plurality of camera sensors mounted on the vehicle into one view.

The feature extraction operation (S200) may be an operation of extracting a feature map for each pixel included in the vehicle front image data by inputting, by a feature extraction unit 200 as the calculation processing means, the vehicle front image data received in the image input operation (S100) to a pre-stored network.

In the feature extraction operation (S200), a pre-stored semantic segmentation network may be applied to extract the feature map for each pixel, and the pixels may be segmented into a free space region and an object region (e.g., obstacle, vehicle, or person).

The pre-stored semantic segmentation network may use a semantic image segmentation algorithm of a fully convolutional network, which is only an example. The present disclosure is not limited thereto, and may use any network that may distinguish and classify desired regions through an image analysis/processing.

Simply and most ideally, in the feature extraction operation (S200), the free space region and the object region may be accurately segmented through the stored semantic segmentation network, distance information between the obstacle in the object region and the vehicle may thus be analyzed, and the drive state of the front ultrasonic sensor may thus be automatically controlled based on the analyzed distance information.

However, the vehicle front image data may have lower clarity, illuminance, or the like, or a noise region caused by snow or rain may occur, based on the external environment condition, such as cloudy, snowy, or rainy weather. In this case, a result of the image analysis of the semantic segmentation network may have lower accuracy/reliability.

Another additional problem may occur due to misrecognition of the obstacle (or recognition of the free space region as the object region) or non-recognition of the obstacle (or recognition of the object region as the free space region) which may occur if the drive state of the front ultrasonic sensor is automatically controlled by the image analysis performed only based on a result of the region segmentation without considering the external environment condition.

In the feature extraction operation (S200), the vehicle front image data may be analyzed more conservatively to reduce the misrecognition of the obstacle.

To this end, the feature extraction operation (S200) may include a weather classification operation (S210), a region classification operation (S220), a pixel extraction operation (S230), an entropy calculation operation (S240), an entropy comparison operation (S250), and a final segmentation operation (S260), as shown in FIG. 6.

The weather classification operation (S210) may be an operation of classifying a predetermined weather class for each pixel of the input vehicle front image data.

The region classification operation (S220) may be an operation of classifying a predetermined region class for each pixel of the input vehicle front image data.

A general semantic segmentation network may classify each pixel by using a predetermined region class (e.g., object region or free space region), and a result of the classification may be output in the form of a probabilistic map by a softmax function applied as the final activation function when the network performs learning. However, the semantic segmentation network of the present disclosure may further include the weather classification operation (S210) to classify a weather condition of the image to determine whether the image has an environment of a lower analysis performance (or recognition performance).

To this end, it is possible to minimize an increase in an amount of computation by categorizing the weather by additionally connecting two fully connected layers without including a separate base network because an encoder output of the semantic segmentation network is an abstract feature. A result of the weather classification may also be output in the form of a probability map by the softmax function applied as the final activation function when the network performs the learning. In addition, a learning processing may be performed using the predetermined weather class (e.g., sunny, cloudy, rainy, or snowy day).

In the feature extraction operation (S200), the pre-stored semantic segmentation network may be a semantic segmentation network using a weather classification head, using cross entropy loss as a loss function, and using stochastic gradient descent to perform the learning while updating a weight during its supervised learning.

The pixel extraction operation (S230) may be an operation of extracting a pixel having the largest probability value of the object region (or a pixel classified into the object region) in the region classification operation (S220).

The entropy calculation operation (S240) may be an operation of calculating entropy of the pixel extracted in the pixel extraction operation (S230) by using Equation 1 above.

The general semantic segmentation network may extract the obstacle by using the pixel having the largest probability value of the object region without considering the entropy itself.

However, in the feature extraction operation (S200), the object region and the free space region may be classified in units of weather and pixels by using the semantic segmentation network which uses the weather classification head. That is, a pixel having low entropy may be only classified into a final object region to reduce a probability that the free space region is misrecognized as the object region based on the external weather condition.

The entropy comparison operation (S250) may be an operation of comparing a threshold entropy corresponding to a weather class of the pixel extracted in the pixel extraction operation (S230), classified in the weather classification operation (S210), and a calculated entropy of the corresponding pixel, obtained in the entropy calculation operation (S240), based on the predetermined threshold entropy for each weather class.

That is, in the entropy comparison operation (S250), the threshold entropy may be set based on the classified weather of the corresponding pixel, a lower threshold entropy may thus be set for the weather condition having a higher probability of analysis error, and the comparison between the set threshold entropy and the calculated entropy may then be performed.

Here, the predetermined threshold entropies may be set to the following values: 1 as a threshold entropy of a sunny day having the lowest probability of an error occurring in analyzing the vehicle front image data, the smallest value (e.g., 0.3) as a threshold entropy of a rainy/snowy day having the highest probability of analysis error, and a medium value (e.g., 0.5) as a threshold entropy of a cloudy day having a medium probability of analysis error. Threshold entropy setting may be controlled based on detection sensitivity setting of the object region.

The final segmentation operation (S260) may be an operation of finally segmenting the corresponding pixel into the object region when the calculated entropy obtained in the entropy calculation operation (S240) is less than the threshold entropy, based on a result of the comparison in the entropy comparison operation (S250).

That is, in the final segmentation operation (S260), the final segmentation processing may be performed by using a pixel primarily classified into the object region in the region classification operation (S220) to set the threshold entropy based on a weather of the corresponding pixel, and then determining that a result of the primary classification has very high accuracy when the calculated entropy is lower than the set threshold entropy.

In other words, in the final segmentation operation (S260), a result value of a pixel may be classified as a final result value, the result value of a pixel (i.e., pixel having very low uncertainty) having a lower entropy than the threshold entropy (or a criterion that separates uncertainty/certainty) that is lower as the weather condition has the higher probability of analysis error.

In the final segmentation operation (S260), the corresponding pixel may be finally segmented into the free space region by determining that even the pixel primarily classified into the object region has high uncertainty when the calculated entropy obtained in the entropy calculation operation (S240) is greater than or equal to the threshold entropy, based on the result of the comparison in the entropy comparison operation (S250).

The distance analysis operation (S300) may be an operation of analyzing, by a distance analysis unit 300 as the calculation processing means, the distance information between the obstacle in the object region and the vehicle by using a result of the segmentation of the object region in the final segmentation operation (S260).

In detail, in distance analysis operation (S300), a pixel position corresponding to the object region segmented in the final segmentation operation (S260) may be analyzed to analyze the distance information between the vehicle and the obstacle (or a group region including the object region). That is, each pixel position in the vehicle front image data converted to an air view may represent physical coordinates of each pixel, and the distance information may thus be calculated by analyzing the pixel position corresponding to the obstacle region.

The drive control operation (S400) may be an operation of automatically controlling the drive state of the front ultrasonic sensor by using the distance information analyzed in the distance analysis operation (S300).

To this end, the drive control operation (S400) may include a first determination operation (S410), a first control operation (S420), a second determination operation (S430), and a second control operation (S440), as shown in FIG. 6.

The first determination operation (S410) may be an operation of determining, by a drive control unit 400 as the calculation processing means, whether the distance information between the vehicle and the detected obstacle, analyzed in the distance analysis operation (S300), falls within a first predetermined distance.

The first control operation (S420) may be an operation of controlling, by the drive control unit 400 as the calculation processing means, the waveform output from the front ultrasonic sensor to have a predetermined value when the distance information does not fall within the first predetermined distance (or is more than the first predetermined distance), based on a result of the determination in the first determination operation (S410). Here, the distance information does not fall within the first predetermined distance when an obstacle exists beyond the first predetermined distance or there is no obstacle.

In the first control operation (S420), the predetermined value may be the minimum value set in consideration of the minimum detection distance condition of the front ultrasonic sensor, and the output transmission waveform may be reduced to satisfy the minimum requirement, and the front ultrasonic sensor may thus determine only whether there is a nearby obstacle through the minimum output. In this way, in the first control operation (S420), it is possible to minimize the transmission waveform to act as the noise source for an ultrasonic sensor of another vehicle while the requirement of the front ultrasonic sensor is satisfied.

In the control of reducing the transmission waveform output from the front ultrasonic sensor, the output waveform may be controlled by changing a magnitude of a current source or a voltage source.

Here, there may occur the non-recognition of the obstacle (or recognition of the object region as the free space region) due to the weather condition having a high probability of analysis error of the vehicle front image data, and the waveform output from the sensor may still be set to the minimum value in the first control operation (S420), thus causing an accident such as collision with an obstacle that actually exists.

The drive control operation (S400) may further include a third control operation (S450) as shown in FIG. 6 in order to solve this problem.

The third control operation (S450) may be an operation of controlling the reception amplification factor in response to the control of the waveform output from the front ultrasonic sensor by using pre-stored reception amplification factor information.

That is, in the third control operation (S450), the reception amplification factor may be adjusted in an end of line (EOL) in advance based on a situation where the transmission waveform output from the front ultrasonic sensor is gradually reduced to the minimum value, and its result may be stored so that the transmission waveform output from the front ultrasonic sensor has the same sensitivity (or detection distance) even when controlled to be reduced.

In this way, in the third control operation (S450), the reception amplification factor may be changed and set based on the controlled output waveform when the transmission waveform output from the front ultrasonic sensor is controlled, that is, controlled to be reduced to the minimum value in the first control operation (S420). The transmission waveform may thus have the same sensitivity as before the reduction even when the transmission waveform is reduced.

In addition, it is enough for the sensor only to detect the nearby obstacle having a risk of collision within the first predetermined distance. However, the present disclosure sets 2 m as a reference distance for reducing the waveform output from the second ultrasonic sensor to prevent the ultrasonic wave signal from causing the interference rather than being blocked by the obstacle due to an excessively wide free space in front of the vehicle, which is only an example. The first predetermined distance may be a distance at which a driver watching the front may sufficiently prepare for the presence of the obstacle beyond the first predetermined distance without a separate collision detection assist function. The first predetermined distance may be further increased based on a feedback or the like of the actual vehicle driver when the first predetermined distance is insufficient for the driver to detect and prepare for the obstacle without the collision detection assist function.

The second determination operation (S430) may be an operation of determining once again whether the distance information falls within a range of a second predetermined distance when the distance information falls within the first predetermined distance (or the first predetermined distance or less), that is, when the distance information between the vehicle and the detected obstacle is within 2 m, based on the result of the determination in the first determination operation (S410).

The second control operation (S440) may be an operation of controlling the waveform output from the second ultrasonic sensor to correspond to the distance information when the distance information falls within the range of the second predetermined distance, based on a result of the determination in the second determination operation (S430).

In detail, in the second determination operation (S430), the range of the second predetermined distance range may be set to 0.6 m to 1.2 m, which is a distance at which ground reflection may occur, which is also only an example. To explain using this configuration for a proper explanation, the waveform output from the second ultrasonic sensor may be controlled to remain in a default drive state when the distance information does not fall within the range of the second predetermined distance, based on the result of the determination.

In this way, in the second control operation (S440), the front ultrasonic sensor may be controlled to have an output waveform corresponding to the distance information calculated by Equation 2 above when the distance information is 0.6 m or more and 1.2 m or less.

In addition, in the second control operation (S440), the front ultrasonic sensor may be controlled to produce a normal output in the default drive state, thereby performing remote detection when the distance information is more than 1.2 m and is 2 m or less, and the front ultrasonic sensor may be controlled to output the normal output in the default drive state, thereby detecting an obstacle which may impact a vehicle bumper, such as a road bump, in a case that the vehicle out of a beam angle has the minimum ground clearance when the distance information is less than 0.6 m.

In the third control operation (S450) of the drive control operation (S400), the reception amplification factor may be controlled in response to the control of the waveform output from the front ultrasonic sensor by using the reception amplification factor information pre-stored also in the second control operation (S440).

In this way, in the drive control operation (S400), the waveform output from the front ultrasonic sensor may be automatically controlled variably based on the distance between the vehicle and the obstacle analyzed with high reliability, and the ultrasonic wave transmitted to another vehicle may thus be minimized even when the front ultrasonic sensor is constantly driven, which may solve the problems described above.

However, a signal to noise ratio (SNR) may be lower when the reception amplification factor is increased in the third control operation (S450) as the output of the front ultrasonic sensor is reduced.

Accordingly, it may be checked whether a current drive control environment is a noisy environment and the constant drive of the front ultrasonic sensor may be forcibly turned off if there is a significant noise.

That is, the drive of the front ultrasonic sensor itself is an auxiliary function to improve driving convenience rather than an essential function required to drive the vehicle, and there is no problem in driving even when the sensor is forcibly turned off. However, it is required to notify this turn off to the driver to allow the driver who wants this function to manually control the sensor.

To this end, the drive control operation (S400) may further include a noise collection operation (S460), a noise comparison operation (S470), and an alarm provision operation (S480), as shown in FIG. 6.

The noise collection operation (S460) may be an operation of collecting a signal received without the transmission waveform through the reception amplification factor controlled based on the waveform of the sensor, that is, performing noise measurement before the controlled waveform output from the front ultrasonic sensor is transmitted, that is, before the output waveform controlled in the first control operation (S420) or the second control operation (S440) is transmitted.

The noise comparison operation (S470) may be an operation of comparing the received signal collected in the noise collection operation (S460) with a predetermined threshold signal to noise ratio (SNR). Here, the threshold SNR may be predetermined in response to the controlled reception amplification factor.

The alarm provision operation (S480) may be an operation of deactivating the automatic control of the front ultrasonic sensor, and providing a vehicle occupant with an associated alarm signal indicating that the automatic control of the front ultrasonic sensor is deactivated, when the collected received signal is higher than the predetermined threshold SNR, based on a result of the comparison in the noise comparison operation (S470).

On the other hand, the alarm provision operation (S480) may also be an operation of performing the automatic drive control of the front ultrasonic sensor described above when the collected received signal is lower than the predetermined threshold SNR, based on the result of the comparison in the noise comparison operation (S470).

According to the system and method for drive control of front ultrasonic sensors according to the present disclosure as described above, it is possible to constantly drive the front ultrasonic sensor mounted on the front of the vehicle by automatically controlling the drive state of the front ultrasonic sensor through the image analysis of the front of the vehicle, thereby providing the front parking distance warning (PDW) function to assist the driver's safe and comfortable driving when entering or exiting the parking lot or narrow alley having a narrow passage without any separate operation that reduces the driver's driving concentration.

In particular, according to the present disclosure, in order to constantly drive the front ultrasonic sensor, it is possible to make the transmission energy be concentrated in the region of interest while minimizing the energy from being transmitted to another vehicle by variably controlling the transmission waveform of the front ultrasonic sensor in consideration of the distance between the vehicle and the obstacle. It is thus possible to solve the problem of the lower parking assist performance, such as a false warning occurring by the front ultrasonic sensor acting as the noise source/interference source for another vehicle which is an inevitable problem occurring when the sensor is constantly driven or the like.

It is thus possible to constantly drive the ultrasonic sensor even in a complex alleyway or on a narrow road, thereby improving the driving convenience while reducing the probability of an accident.

In addition, according to the present disclosure, in order to solve the problem that the result of the image analysis may have lower accuracy/reliability in performing the analysis on the front of the vehicle, based on the external weather, it is possible to resolve the misrecognition/non-recognition of the obstacle by classifying external weather environment condition and then changing the confidence level of the threshold value of the image analysis.

In detail, according to the present disclosure, it is possible to automatically control the drive state of the front ultrasonic sensor based on the result of the image analysis with the high reliability by minimizing the misrecognition of the object by performing the image analysis more conservatively through the change in the threshold value of the confidence level in the image analysis in consideration of the external weather environment condition (e.g., cloudy, rainy, or snowy weather condition) which may lower the reliability of the result of the image analysis, and by simultaneously controlling the reception amplification factor to solve the non-recognition of the object which may still occur.

The present disclosure is not limited to the above-mentioned embodiments, may be variously applied, and may be variously modified without departing from the gist of the present disclosure claimed in the claims.

What is claimed is:

1. A system for controlling a front ultrasonic sensor disposed at a front of a vehicle and configured to detect an obstacle positioned in front of the vehicle, the system comprising:
an image reception unit configured to receive vehicle front image data;
a feature extraction unit configured to input the vehicle front image data to a pre-stored network and extract, from the pre-stored network, a feature map for each pixel of the vehicle front image data;
a distance analysis unit configured to analyze, based on the extracted feature map, a distance between an obstacle in an object region and the vehicle; and
a drive control unit configured to control, based on the distance, the front ultrasonic sensor,
wherein the pre-stored network includes a semantic segmentation network, and
wherein the feature extraction unit includes:
a weather classification unit configured to classify a predetermined weather class for each pixel;
a region classification unit configured to classify a predetermined region class for each pixel;
an entropy calculation unit configured to extract a pixel classified into the object region by the region classification unit and calculate an entropy of the extracted pixel;
a comparison processing unit configured to compare, based on a predetermined threshold entropy for each weather class, a threshold entropy corresponding to the classified weather class and calculated entropy of a corresponding pixel; and
a segmentation unit configured, in response to the calculated entropy being less than the threshold entropy, to segment the corresponding pixel into the object region.

2. The system of claim 1, wherein the segmentation unit is configured, in response to the calculated entropy being greater than or equal to the threshold entropy, to segment the corresponding pixel into a free space region.

3. The system of claim 1, wherein the distance analysis unit is configured to analyze the distance based on a result of segmenting the object region by the segmentation unit.

4. The system of claim 3, wherein the drive control unit includes:
a first determination unit configured to determine whether the distance is within a range of a first predetermined distance; and
a first control unit configured to control, in response to the distance being not within the range of the first predetermined distance, the front ultrasonic sensor to output a first waveform having a predetermined value.

5. The system of claim 4, wherein the drive control unit further includes:
a second determination unit configured, in response to the distance being not within the range of the first predetermined distance, to determine whether the distance is within a range of a second predetermined distance; and
a second control unit configured, in response to the distance being within the range of the second predetermined distance, to control the front ultrasonic sensor to output a second waveform corresponding to the distance.

6. The system of claim 5, wherein the drive control unit further includes a reception control unit configured to control, based on pre-stored reception amplification factor information, a reception amplification factor of the front ultrasonic sensor.

7. The system of claim 6, wherein:
the drive control unit further includes a noise determination unit configured to:
collect a signal received without a transmission waveform before the front ultrasonic sensor transmits the first waveform;
compare the collected received signal with a predetermined threshold signal-to-noise ratio (SNR), and
the drive control unit is further configured, in response to the collected received signal being higher than the predetermined threshold SNR, to deactivate controlling of the front ultrasonic sensor and provide a vehicle occupant with an alarm signal.

8. A method of operating a front ultrasonic sensor of a vehicle, the method comprising:
receiving vehicle front image data;
inputting the received vehicle front image data to a pre-stored network and extracting, from the pre-stored network, a feature map for each pixel of the vehicle front image data;
analyzing, based on the extracted feature map, a distance between an obstacle in an object region and the vehicle; and
controlling the front ultrasonic sensor to detect the obstacle in front of the vehicle based on the distance,
wherein extracting the feature map comprises:
classifying a predetermined weather class for each pixel;
classifying a predetermined region class for each pixel;
extracting a pixel classified into the object region;
calculating an entropy of the extracted pixel;
comparing, based on a predetermined threshold entropy for each weather class, a threshold entropy corresponding to the classified weather class and calculated entropy of a corresponding pixel; and
segmenting the corresponding pixel into the object region in response to the calculated entropy being less than the threshold entropy.

9. The method of claim 8, wherein segmenting the corresponding pixel into the object region comprises, in response to the calculated entropy being greater than or equal to the threshold entropy, segmenting the corresponding pixel into a free space region.

10. The method of claim 8, wherein analyzing the distance between the obstacle in the object region and the vehicle comprises:

extracting the obstacle based on a result of segmenting the corresponding pixel into the free space region; and analyzing the distance between the obstacle and the vehicle.

11. The method of claim 10, wherein controlling the front ultrasonic sensor comprises:

determining whether the analyzed distance is within a range of a first predetermined distance; and in response to determining that the distance is not within the first predetermined distance, controlling the front ultrasonic sensor to output a first waveform having a predetermined value.

12. The method of claim 11, wherein controlling the front ultrasonic sensor further comprises:

in response to the analyzed distance being within the range of the first predetermined distance, determining whether the analyzed distance is within a range of a second predetermined distance; and in response to the analyzed distance being not within the range of the second predetermined distance, controlling the front ultrasonic sensor to output a second waveform corresponding to the distance.

13. The method of claim 12, wherein controlling the front ultrasonic sensor further comprises controlling, based on pre-stored reception amplification factor information, a reception amplification factor of the front ultrasonic sensor.

14. The method of claim 13, wherein controlling the front ultrasonic sensor further comprises:

collecting a signal received without a transmission waveform before the front ultrasonic sensor transmits the first waveform;

comparing the collected signal with a predetermined threshold signal-to-noise ratio (SNR); and in response to the collected signal being higher than the predetermined threshold SNR, deactivating controlling of the front ultrasonic sensor and providing a vehicle occupant with an alarm signal.

* * * * *